R. B. PRICE.
PROCESS OF TREATING COMBINED PLASTIC AND FABRIC ARTICLES.
APPLICATION FILED JAN. 9, 1912.
1,152,836.
Patented Sept. 7, 1915.
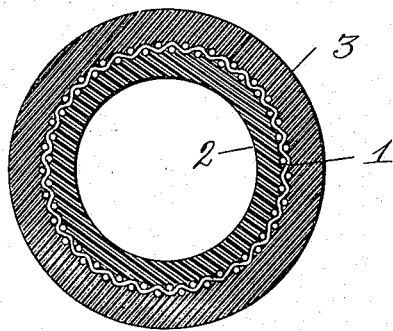
Witnesses
Inventor
Raymond B. Price
By Percy B. Hills
Attorney

UNITED STATES PATENT OFFICE.

RAYMOND B. PRICE, OF MISHAWAKA, INDIANA.

PROCESS OF TREATING COMBINED PLASTIC AND FABRIC ARTICLES.

1,152,836.

Specification of Letters Patent.

Patented Sept. 7, 1915.

Application filed January 9, 1912. Serial No. 670,345.

*To all whom it may concern:*

Be it known that I, RAYMOND B. PRICE, a citizen of the United States, residing at Mishawaka, in the county of St. Joseph, State of Indiana, have invented new and useful Improvements in Processes of Treating Combined Plastic and Fabric Articles, of which the following is a specification.

My invention relates to fabric and plastic articles and to the manufacture of the same wherein a layer or layers of fabric are interposed between layers of rubber or other plastic material, such as in a hose or tire, and afterward vulcanized or otherwise set, and has for its object to provide an improved means for more firmly compacting the same, either before or during the vulcanizing or setting operation.

In the accompanying drawing the figure is a transverse sectional view of a hose adapted to be operated on in accordance with my present invention.

In carrying out my invention I provide for the article to be treated an intermediate body portion 1 composed preferably of a plurality of layers of fabric, such as duck, preferably impregnated with rubber, and apply to each side of the same a layer of plastic material 2 and 3, such as rubber, and then subject the whole to the vulcanizing operation in a suitable medium, either fluid or gaseous, at the vulcanizing temperature, and at such temperature exerting no deleterious effect on the material being treated, such, for instance, as described in an application filed by me December 30, 1911, Serial No. 668,792.

It will be understood that the above contemplates the application of a medium to the exterior of the article being treated, and also a separate medium to the interior thereof, and said mediums may be the same in character or may differ in any manner, as may be desired.

In carrying out this process it will be understood that I contemplate applying controllable pressures to the medium or mediums so that the material may be acted on by said pressures on both sides. I also contemplate employing in connection with said medium or mediums a controllable vacuum applied to the inclosed fabric only, whereby any gas or moisture contained therein may be withdrawn either before or during the vulcanizing operation, in order to effect a more firm and homogeneous union of the rubber and fabric under the vulcanizing operation. I also contemplate, under certain circumstances, the employment of a pressure exerted on the fabric in place of the vacuum hereinbefore described, as under certain conditions it may be found necessary to so treat the material, the pressure of the external containing medium, as well as that of the internal medium, being controlled accordingly, so that, when desired, both an internal pressure on the fabric and an external pressure on the article may be had, and said pressures may be varied so that the internal pressure on the fabric may be either less, or equal to, or greater than the external pressure or pressures, or said internal fabric pressure may be converted into a vacuum.

It will be understood that I contemplate the application of this invention to other than tubular articles, as it is equally well adapted for use with any form of flat article wherein a fabric interior is covered on both sides with plastic material.

A further object of my invention has particular reference to the manufacture of tire casings, and relates to the method of subjecting the same, when built up, to the usual vulcanization. In carrying out this feature I first form or build up the tire casing in any manner on a core that has no projecting lugs to lie between the tire casing attaching edges, and then place said casing, together with its core, on any one of the metallic rims now in use on automobiles, a requirement as to said rim being that it shall be such that the tire can be mounted thereon without stretching the same, this being rendered necessary by the fact that the tire is so mounted while it still contains the metallic core upon which it has been built up. Such a rim is that which is commonly known in the art as a quick detachable rim, which has a removable retaining flange upon one side adapted to be removed to permit the tire to be adjusted thereon sidewise without stretching. The built-up tire so mounted upon the rim, and with the removable flange of said rim replaced in position, is then subjected to the vulcanizing operation in any suitable manner. If desired, the sections of the rim may be clamped or spring clamped together to insure proper shaping of the tire during vulcanization.

I do not wish to limit myself to the use of a conventional tire rim, as above described, as I may employ a specially prepared support, the only requirement being that the space between the tire attaching edges be bridged thereby. By thus bridging the space between said edges I provide for sealing the space between the tire casing and its core against access of the vulcanizing medium, which sealing may be done with some form of plastic material. This sealing may not be necessary under all circumstances, however, but will be should either a vacuum or a pressure be applied to said space.

Having thus described my invention, what I claim as new and desire to secure by Letters Patent is:

1. The method of treating articles formed of a fabric interior and having exterior surfaces of plastic material on both sides of the fabric, which consists in subjecting the fabric to the action of a fluid pressure and during or subsequent to said action, subjecting the exterior surfaces to a greater pressure, whereby fluids in said fabric and plastic material will be removed, the plastic material will be compacted and the plastic and non-plastic portions will be properly united.

2. The method of treating articles formed of a fabric layer having exterior surfaces of plastic material on both sides of the fabric, which consists in exerting simultaneously a controllable pressure upon said fabric layer and separate controllable pressures upon the exterior surfaces of plastic material thereof during the setting operation.

3. The method of producing articles of vulcanizable plastics consisting in forming an article of raw plastic material having embedded therein a non-plastic stratum, subjecting the non-plastic stratum to the action of a fluid pressure and during or subsequent to said action, subjecting the exterior surface to a greater pressure, whereby fluids in said plastic or non-plastic material will be removed, the plastic material will be compacted and the plastic and non-plastic portions will be properly united.

4. The method of producing articles of vulcanizable plastics consisting in forming an article of raw or green plastic material having a fabric embedded therein, and applying a suction to said fabric, whereby said plastic material will be brought into intimate union with said fabric, the fluids will be removed from said plastic material and fabric, and said plastic material will be compacted, and vulcanizing said article while so compacted.

In testimony whereof, I have hereunto set my hand in the presence of two subscribing witnesses.

RAYMOND B. PRICE.

Witnesses:
 A. M. DISCH,
 A. R. BOARDMAN.